United States Patent [19]

Ehlers

[11] 3,891,839

[45] June 24, 1975

[54] METHOD AND APPARATUS FOR IDENTIFYING AN INVALID CHARACTER CODE

[75] Inventor: Randall G. Ehlers, San Jose, Calif.

[73] Assignee: Burroughs Corporation, Detroit, Mich.

[22] Filed: July 22, 1974

[21] Appl. No.: 490,563

[52] U.S. Cl. .......................... 235/153 AS; 178/23 A

[51] Int. Cl.[2] ....................... G06K 5/02; B41B 25/24

[58] Field of Search .............. 178/23 A; 235/153 AS

[56] References Cited

UNITED STATES PATENTS 3,240,920 3/1966 Barbagallo et al. ........... 235/153 AS

*Primary Examiner*—Malcolm A. Morrison
*Assistant Examiner*—R. Stephen Dildine, Jr.
*Attorney, Agent, or Firm*—Albin H. Gess; Nathan Cass; Kevin R. Peterson

[57] ABSTRACT

In train printers utilizing a "universal" or "soft" translate buffer wherein the code representations for the characters on the type train may be changed or reprogrammed by reloading the translate buffer, an efficient way of determining whether each character code being received represents a character in the type train being utilized is to use the character code as an address to a read/write memory which stores a logic 1 in all locations that are addressed by valid character codes and a logic 0 in all other or invalid character code locations. The output from this memory, each time it is addressed is utilized to activate a selector to pass either the incoming character code or an invalid character code from an invalid character code register, depending on whether the memory output was a logic 1 or a logic 0, respectively.

3 Claims, 1 Drawing Figure

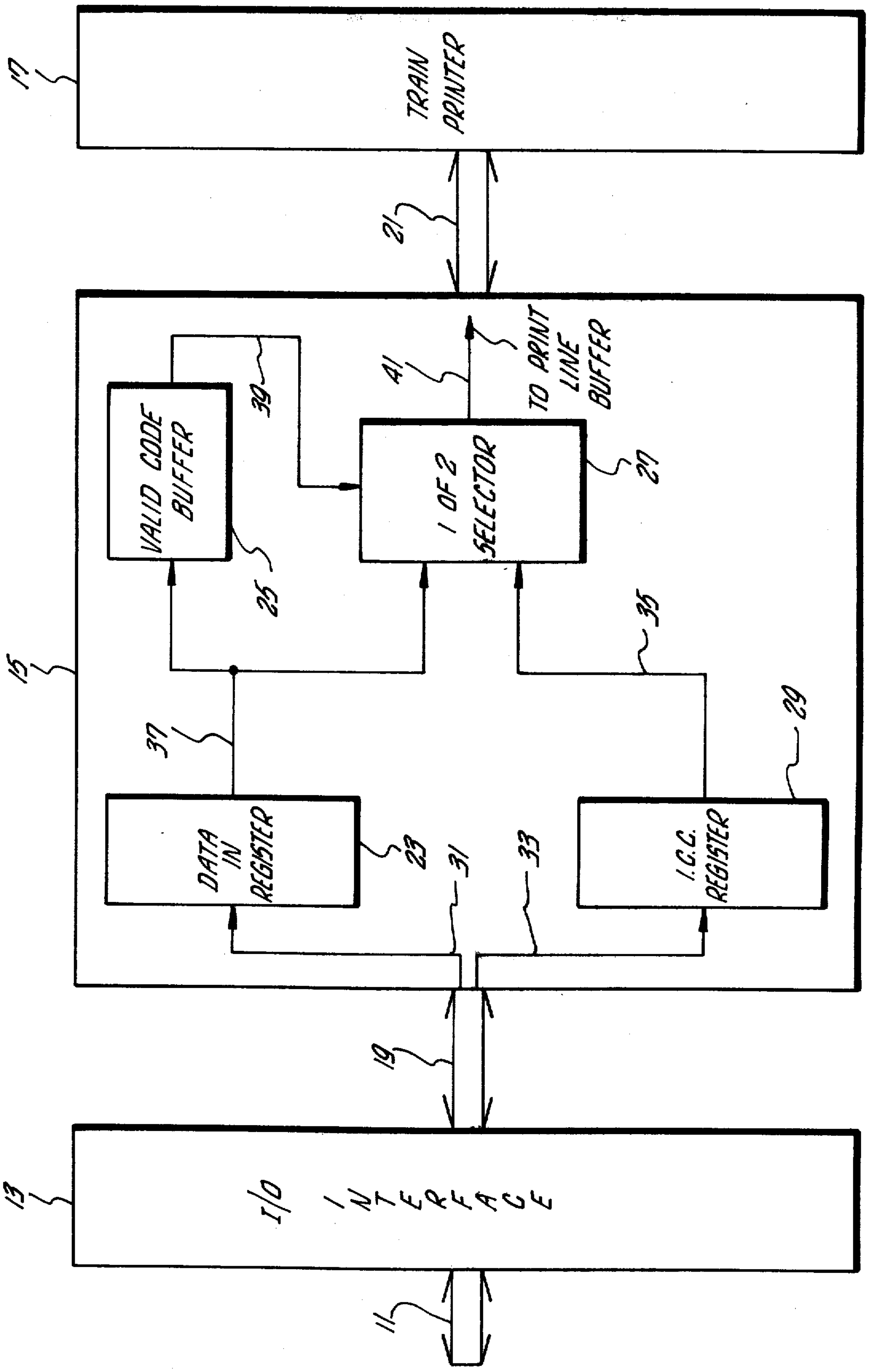
TRAIN PRINTER
17
21
VALID CODE BUFFER
39
41
TO PRINT LINE BUFFER
1 OF 2 SELECTOR
27
25
15
35
37
29
DATA IN REGISTER
23
31
33
I.C.C. REGISTER
19
13
I/O INTERFACE
11

METHOD AND APPARATUS FOR IDENTIFYING AN INVALID CHARACTER CODE

BACKGROUND OF THE INVENTION

The present invention relates generally to improvements in train printer controllers and more particularly pertains to new and improved train printer controllers wherein a programmable translate buffer is utilized to provide for easy and rapid changing of the code representations for the characters on the type train whenever a different type train having a different character set is placed on the printer.

Those concerned with the development of train printer controllers have long recognized the need for providing an efficient way of determining whether each character code being received represents a character in the type train being utilized. The present invention provides a method and apparatus for accomplishing such an end.

SUMMARY OF THE INVENTION

It is an object of this invention to provide an improved method of verifying and indicating that each received character code, representing a character to be printed is within the previously defined character set.

It is a further object of this invention to provide apparatus for verifying and indicating that each received character code, representing a character to be printed is within the previously defined character set.

These objects and the general purpose of this invention are accomplished by addressing a read/write memory with each character code in the character set as it is being loaded into the translate buffer. A logic 1 is written into each location addressed by the character codes in the set. All other locations not addressed remain at logic 0. An invalid character code is stored in an I.C.C. register. As each character code for a print line is received, it addresses the read/write memory. If it is a valid character code, a logic 1 is read out of the memory. This logic 1 causes a one of two selector to pass the received character code to a print line buffer. If a code that did not represent a character in the set had been received, a logic zero would have been read from the memory. This logic zero would cause the one of two selector to pass the invalid character code from the I.C.C. register to the print line buffer. This invalid character code causes the character chosen to represent an invalid character code to be printed.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof and wherein:

The FIGURE illustrates in block diagram form the preferred embodiment of this invention.

DESCRIPTION OF THE PREFERRED EMBODIMENT

The FIGURE, which illustrates the preferred embodiment of a character code verifier utilized in a train printer controller, shows a controller 15 connected to a train printer 17 by way of cables 21 and to an I/O interface 13 by way of cables 19. The I/O interface 13 could be connected to a data processing system (not shown) or a data communication network (not shown) by way of cables 11. The parts of the train printer controller 15 that comprise this invention are shown as a data in register 23 having its output connected to a valid code buffer 25 and a one of two selector 27. Besides receiving data from the data in register, the one of two selector 27 receives data from an incorrect character code (I.C.C.) register 29. The output of the valid code buffer 25, a control signal, is supplied, over line 39, to the one of two selector 27. The output of the one of two selector 27 on line 41 is transmitted to the print line buffer (not shown). The remaining elements of the train printer controller 15 are seen as well known in the art and will not be discussed herein. An example of the type of train printer controller that the present invention may be utilized with can be found in U.S. Pat. No. 3,760,366 for unprintable character recognition by John S. Gregor.

The valid code buffer 25 is preferably a 256 by 1 bit read/write memory that is available as an off-the-shelf item from printed circuit manufactures. An example of such a memory is the TTL memory 93410, manufactured by Fairchild Semiconductor and listed in their June 1972 parts catalogue on page 9–27. The address decoders of this memory are capable of handling a word length of 8 bits. This is the preferred word length for most train printer controllers and the particular type of train printer controller with which this invention may be utilized. Prior to a print operation all the storage locations in the valid code buffer 25 are cleared so that a logic zero is effectively written into each storage location.

The one of two selector 27 selects between two 8 bit wide parallel paths, 35 and 37. The selector may be constructed from off-the-shelf integrated circuit elements available from various integrated circuit manufacturers. One example of the elements that may be utilized is a quad two input multiplexor manufactured by Fairchild Semiconductor and listed in their June 1972 parts catalogue on page 8–17. This multiplexor chip has 8 inputs, 4 outputs, and 2 control lines, a select control line and an enable control line. By utilizing two such chips in parallel one of the two groups of 8 incoming lines is selected for output on the 8 outgoing lines, depending upon the state of the select control lines.

A clocking source and clock lines to the various elements of the train printer controller 15 that comprises the invention are not shown because they are seen as well within the purview of a person of ordinary skill in the art. It should be understood that the registers 23, 29, the valid code buffer 25, and the one of two selector 27 all receive clocking signals and are operating synchronously.

Prior to a print operation, an eight bit wide invalid character code is loaded into I.C.C. register 29 over lines 33. The parallel output of I.C.C. register 29 is made available as a first group of parallel input lines 35 to the one of two selector 27. The code stored within I.C.C. register 29 is resident therein until reloaded at some future time. The code utilized identifies a character on the type train being used on the train printer. This character may be a question mark, for example, or any other character that is understood to represent the condition that the character code received from a data processing or data communication system is not identifiable as being a part of the character set defined by the type train being used by the train printer.

Prior to a print operation, a translate table (not shown), which is part of the train printer control 15, is loaded with the character codes that identify each character on the type train presently being used on the train printer. As each character code is loaded into the translate table it is supplied to the data in register 23 over parallel input lines 31 from where it addresses the valid code buffer 25 causing a logic one level to be written into that area in memory addressed by this particular character code. Even though the output lines 37 of data in register 23 are also supplied as an input to the one of two selector 27, the selector 27 remains inactive at this time. This occurs because the valid code buffer 25 does not produce an output signal on line 39 when write operations are being performed on it. Each character code, as it is loaded into the translate buffer (not shown), is used to address the valid code buffer 25 in this manner. Upon all the character codes being loaded into the translate buffer, the valid code buffer 25 will have logic one levels stored in all of the memory locations that were addressed by the character codes. All of the other non-addressed memory locations will have logic zero levels stored therein since the initial state of the valid code buffer 25 was all storage locations at logic zero.

During a print operation, each character code that is received from the I/O interface 13 over cables 19 is supplied to the data in register 23 over input lines 31. This character code is utilized to address the valid code buffer 25 and the one of two selector 27 over input lines 37. If the received character code is within the set of character codes previously loaded into the translate buffer, the output of the valid code buffer 25 when being addressed by this character code will be a logic one level on line 39. This logic one level causes the one of two selector 27 to select the received character code and transmit it to a print line buffer (not shown) over lines 41. This same operation occurs for each character code as it is loaded into the print line buffer.

Assume now that an invalid character code is received, in other words, a character code that is not within the set of character codes that was loaded into the translate buffer is received. When this character code addresses the valid code buffer 25, a logic zero will be read out of the valid code buffer on output line 39. This logic zero level will cause one of two selector 27 to select the character code in I.C.C. register 29 for transmission to the print line buffer (not shown) on lines 41. When the print line buffer is loaded and a line is to be printed, the invalid character code will cause the previously identified invalid character on the type train to be printed. The printing of the invalid character in this manner quickly identifies to the programmer at what point an invalid character code was received, thereby flagging programming errors and possible hardware errors.

To summarize, an improved method and apparatus for verifying and indicating that each character code received by the train printer controller is within the previously defined character set, has been described and illustrated. It should be understood, of course, the foregoing disclosure relates only to a preferred embodiment of the invention and that numerous modifications may be made therein without departing from the spirit and scope of the invention as set forth in the appended claims.

What is claimed is:

1. A method for verifying that a received character code to be included in a print line identifies a character within a previously defined character set, the method comprising:

writing a predetermined logical signal into each storage location in a read/write memory having an address corresponding to a character code of the defined character set;

storing in a register, a character code that represents the invalid character in the previously defined character set;

addressing the read/write memory with each received character code that is intended to be included in a print line; and selecting either the received character code or the invalid character code to be included in the print line in response to the signal read out of the read/-write memory.

2. A method for verifying that a received character code to be read into a print line buffer identifies a character within a previously defined character set, the method comprising:

clearing all storage locations in a read/write memory to a first predetermined logical signal representation;

writing a second predetermined logical signal representation into each storage location in a read/write memory having an address corresponding to a character code of the defined character set;

storing a character code that represents an invalid character in the defined character set;

addressing the read/write memory with each received character code that is intended to be read into said print line buffer; and selecting either the received character code or the invalid character code to be read into said print line buffer, depending on the logic level read out of the read/write memory.

3. In a train printer wherein the code representations for the characters on the type train may be changed, an apparatus for verifying that a received character code to be written into a print line buffer is within a defined character set, the apparatus comprising:

a storage means for storing a first predetermined logical signal representation in those storage locations addressed by the character codes in the character set and storing a second predetermined logical signal representation in all other storage locations;

a register means for storing a character code that represents the invalid character in the character set; and a one of two selector means for passing either a received character code or the character code in said register means to said print line buffer, depending on the output signal of said storage means.

* * * * *